US007466962B2

(12) United States Patent
Peplinski et al.

(10) Patent No.: US 7,466,962 B2
(45) Date of Patent: Dec. 16, 2008

(54) METHODS AND APPARATUS OF PROVIDING A RADIO FREQUENCY LOCAL OSCILLATOR SIGNAL FOR A TRANSCEIVER

(75) Inventors: Neil R. Peplinski, North Barrington, IL (US); Aaron W. Netsell, Woodstock, IL (US); Jason B. Onstot, Algonquin, IL (US)

(73) Assignee: Motorola, Inc, Schaumburg, IL (US)

(*) Notice: Subject to any disclaimer, the term of this patent is extended or adjusted under 35 U.S.C. 154(b) by 445 days.

(21) Appl. No.: 11/152,608

(22) Filed: Jun. 14, 2005

(65) Prior Publication Data

US 2006/0281419 A1 Dec. 14, 2006

(51) Int. Cl.
*H04B 1/44* (2006.01)

(52) U.S. Cl. ............................ 455/83; 455/73; 455/78; 455/82

(58) Field of Classification Search .................. 455/73, 455/78, 82–83, 550.1, 86, 87
See application file for complete search history.

(56) References Cited

U.S. PATENT DOCUMENTS

| | | | | |
|---|---|---|---|---|
| 5,710,762 | A * | 1/1998 | Petranovich | 370/280 |
| 5,715,520 | A * | 2/1998 | Hillock et al. | 455/76 |
| 5,790,527 | A * | 8/1998 | Janky et al. | 370/330 |
| 6,026,114 | A | 2/2000 | Koh | |
| 6,041,046 | A | 3/2000 | Scott et al. | |
| 6,272,329 | B1 | 8/2001 | Sawchuk | |
| 6,405,022 | B1 * | 6/2002 | Roberts et al. | 455/76 |
| 6,496,142 | B1 * | 12/2002 | Iinuma | 342/368 |
| 6,738,602 | B1 | 5/2004 | Heinen et al. | |
| 7,245,596 | B2 * | 7/2007 | Cooley et al. | 370/329 |
| 2001/0031622 | A1 * | 10/2001 | Kivela et al. | 455/11.1 |
| 2004/0203470 | A1 * | 10/2004 | Berliner et al. | 455/67.16 |

FOREIGN PATENT DOCUMENTS

WO WO 01/89093 A2 11/2001

* cited by examiner

*Primary Examiner*—Nay A Maung
*Assistant Examiner*—Tuan H Nguyen

(57) ABSTRACT

In the present technique of duplex local oscillator technique provided, a radio frequency local oscillator frequency and a duplex local oscillator frequency at a selected timeslot are assessed (516, 520) to provide a radio frequency local oscillator signal (518) and a duplex local oscillator signal (522), respectively. The duplex local oscillator signal and the radio frequency local oscillator signal are mixed (524) to provide a converted radio frequency local oscillator signal, which is then provided (526) for output.

10 Claims, 6 Drawing Sheets

METHODS AND APPARATUS OF PROVIDING A RADIO FREQUENCY LOCAL OSCILLATOR SIGNAL FOR A TRANSCEIVER

TECHNICAL FIELD

This invention relates generally to a technique for providing a radio frequency local oscillator signal for a transceiver.

BACKGROUND

FIG. 1 shows an exemplary frequency hopping base station radio, which is indicated generally at reference numeral 100. On the transmit side and receive side, the base station radio 100 generally includes two transmitter local oscillators 102, 104 and two receiver local oscillators 106, 108 that are connected to a transmitter switch section 110 and a receiver switch section 112, respectively. In particular, the first transmitter local oscillator 102 and second transmitter local oscillator 104 are respectively connected to a first transmitter switch 114 and a second transmitter switch 116. These transmitter switches 110, 112 are, in turn, connected to a third transmitter switch 118 that ultimately outputs transmitter local oscillator signals from the transmitter local oscillators 102, 104 to a transmitter mixer 120. Similarly, on the receiver side, the receiver local oscillators 106, 108 are respectively connected to a first receiver switch 122 and a second receiver switch 124, which are directly connected to a third receiver switch 126 that outputs receiver local oscillator signals from the receiver local oscillators to a receiver mixer 128.

As shown, at the transmitter side, a microprocessor 130 is used to provide a transmitter intermediate frequency signal to a transmitter intermediate frequency section 132 connected to the transmitter mixer 120. Taking both transmitter local oscillator signals from the transmitter switch section 110 and transmitter intermediate frequency signals from the transmitter intermediate frequency section 132, these signals are mixed to provide a transmitter mixed signal for output to a transmitter radio frequency section 134. The transmitter mixed signals are then converted to provide transmitter radio frequency signals for transmission via a power amplifier 136, a duplexer 138, and an antenna 140. On the receiver side, on the other hand, after adjustment of a received radio frequency signal through the duplexer 138, a low noise amplifier 142 forwards the received radio frequency signal to a receiver radio frequency section 144 that filters and amplifies the signal and outputs it to the receiver mixer 128. Specifically, the receiver mixer 128 mixes the receiver radio frequency local oscillator signal from the receiver switch section 112 and receiver radio frequency signal from the receiver radio frequency section 144 for output to a receiver intermediate frequency section 146, which filters and amplifies the intermediate frequency signal for output to the micro-processor 130.

It is well-known in the art that full duplex communications systems having a time offset between transmit and receive traditionally require base station radios to have extensive hardware, as described in FIG. 1, in order to provide fast-frequency hopping capacity. Emerging communication markets, however, demand low-cost, small-sized cellular base stations without sacrificing frequency hopping capability. Thus, conventional base station radios are inefficient in cost and size because of their extensive hardware associated with this requirement of both a transmitter local oscillator and a receiver local oscillator.

BRIEF DESCRIPTION OF THE DRAWINGS

The above needs are at least partially met through provision of the method and apparatus of providing a duplex radio frequency local oscillator signal described in the following detailed description, particularly when studied in conjunction with the drawings, wherein.

Figure 1:
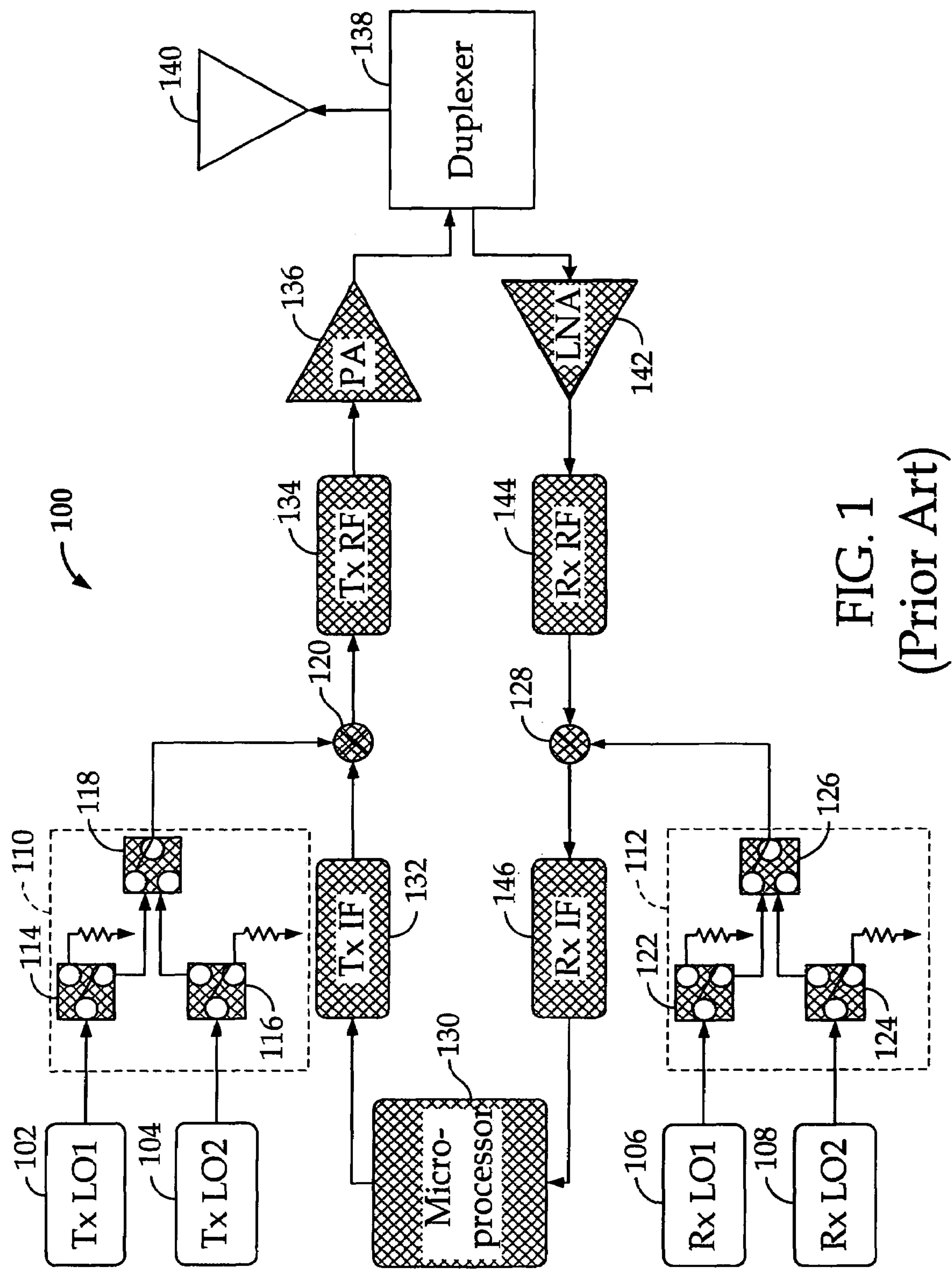
FIG. 1 comprises a prior art base station radio.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a radio frequency local oscillator frequency and a duplex local oscillator frequency at a selected timeslot are assessed to provide a radio frequency local oscillator signal and a duplex local oscillator signal, respectively. The duplex local oscillator signal and the radio frequency local oscillator signal are mixed to provide a converted radio frequency local oscillator signal, which is then provided for output.

In particular, in one embodiment, the converted radio frequency local oscillator signal is part of a transmitter local oscillator signal converted from a receiver signal or vice versa. According to another embodiment, the duplex local oscillator frequency at the selected timeslot is a predefined duplex local oscillator frequency assigned to multiple timeslots that include the selected timeslot. In one specific embodiment, prior to the assessment of the duplex local oscillator frequency, a radio frequency local oscillator frequency at an offset timeslot, which is offset by a predefined transmitter-to-receiver timeslot offset value from the selected timeslot, is assessed and converted to the duplex local oscillator frequency at the selected timeslot based, at least in part, on a predetermined condition.

Furthermore, in yet another embodiment, a channel frequency list is used to obtain the radio frequency local oscillator frequency at the selected timeslot prior to mixing the duplex local oscillator signal and the radio frequency local oscillator signal. In one specific embodiment, the duplex local oscillator signal and the radio frequency local oscillator are provided to a mixer for mixing of the signals. According to an embodiment, prior to assessing the duplex local oscillator frequency at the selected timeslot, a connection for communications is established and maintained, which continues to assess a duplex local oscillator frequency at each timeslot of multiple timeslots to provide a converted radio frequency local oscillator until the connection is terminated. In one embodiment, the method is repeated for a next timeslot. Specifically, it is determined whether a next timeslot is available, and if so, the next timeslot is selected for assessing a duplex local oscillator frequency at this newly selected timeslot to provide a converted radio frequency local oscillator signal.

According to various embodiments, a radio frequency local oscillator frequency at an offset timeslot, which is offset by a predefined transmitter-to-receiver timeslot offset value from a selected timeslot, is assessed and converted to a duplex local oscillator frequency at the selected timeslot based, at least in part, on a predetermined condition. The duplex local oscillator frequency is stored to a data structure. In one embodiment, the duplex local oscillator frequency at the selected timeslot is used to generate a converted radio frequency local oscillator signal. According to one embodiment, prior to the assessment of the radio frequency local oscillator frequency at the offset timeslot, the transmitter-to-receiver timeslot offset value and a channel frequency list are assessed to obtain the radio frequency local oscillator frequency at the offset timeslot.

Another value of a duplex spacing value, in one embodiment, is assessed as a basis for the predetermined condition prior to the conversion of the radio frequency local oscillator frequency at the offset timeslot to the duplex local oscillator frequency at the selected timeslot. According to an embodiment, the predetermined condition is based, at least in part, on a radio frequency local oscillator frequency at the selected timeslot assessed from a channel frequency list. In yet another embodiment, the predetermined condition is based on a duplex spacing and a radio frequency local oscillator frequency at the selected timeslot obtained from a channel frequency list, which are all assessed prior to the conversion of the radio frequency local oscillator frequency at the offset timeslot to the duplex local oscillator frequency at the selected timeslot. The method is repeated for a next timeslot according to an embodiment. In particular, it is determined whether a next timeslot is available, and if so, the next timeslot is selected for assessing a duplex local oscillator frequency at this newly selected timeslot to provide a converted radio frequency local oscillator signal.

According to various teachings, an apparatus preferably includes a duplex local oscillator that assesses a radio frequency local oscillator frequency at a selected timeslot to provide a radio frequency local oscillator and a duplex local oscillator frequency at the selected timeslot to provide a duplex local oscillator signal. The apparatus further includes a mixer coupled to the duplex local oscillator that mixes the duplex local oscillator signal and the radio frequency local oscillator signal to provide a converted radio frequency local oscillator signal. In one specific embodiment, a transceiver that is coupled to the mixer is further included to provide the radio frequency local oscillator signal at the selected timeslot to the mixer. In one embodiment, the duplex local oscillator frequency at the selected timeslot is a predefined duplex local oscillator frequency assigned to multiple timeslots, which includes the selected timeslot. In a specific embodiment, the duplex local oscillator further assesses a radio frequency local oscillator frequency at an offset timeslot, which is offset by a predefined transmitter-to-receiver timeslot offset value from the selected timeslot. The radio frequency local oscillator frequency at the offset timeslot is converted to the duplex local oscillator frequency at the selected timeslot base on the predetermined condition.

Through the embodiments of various teachings, an improved duplex frequency synthesizer has been provided that allows for the removal of at least one transmitter and/or receiver local oscillator frequency synthesizer section. Since the component count of the synthesizer is reduced, direct material cost and printed circuit board space are, in turn, reduced. Moreover, this reduction of the synthesizer is achieved without sacrificing frequency hopping capabilities and/or time offset required for a frequency hopping full duplex communications channel. The various embodiments further offer great flexibility in their implementation in that they can be applied to any air-interface standard where frequency hopping and full duplex communications channels are required. Potentially, this reduction of direct material cost can save millions of dollars, and at the same time, the extra printed circuit board space can provide extra space for additional features to be added.

Figure 2:
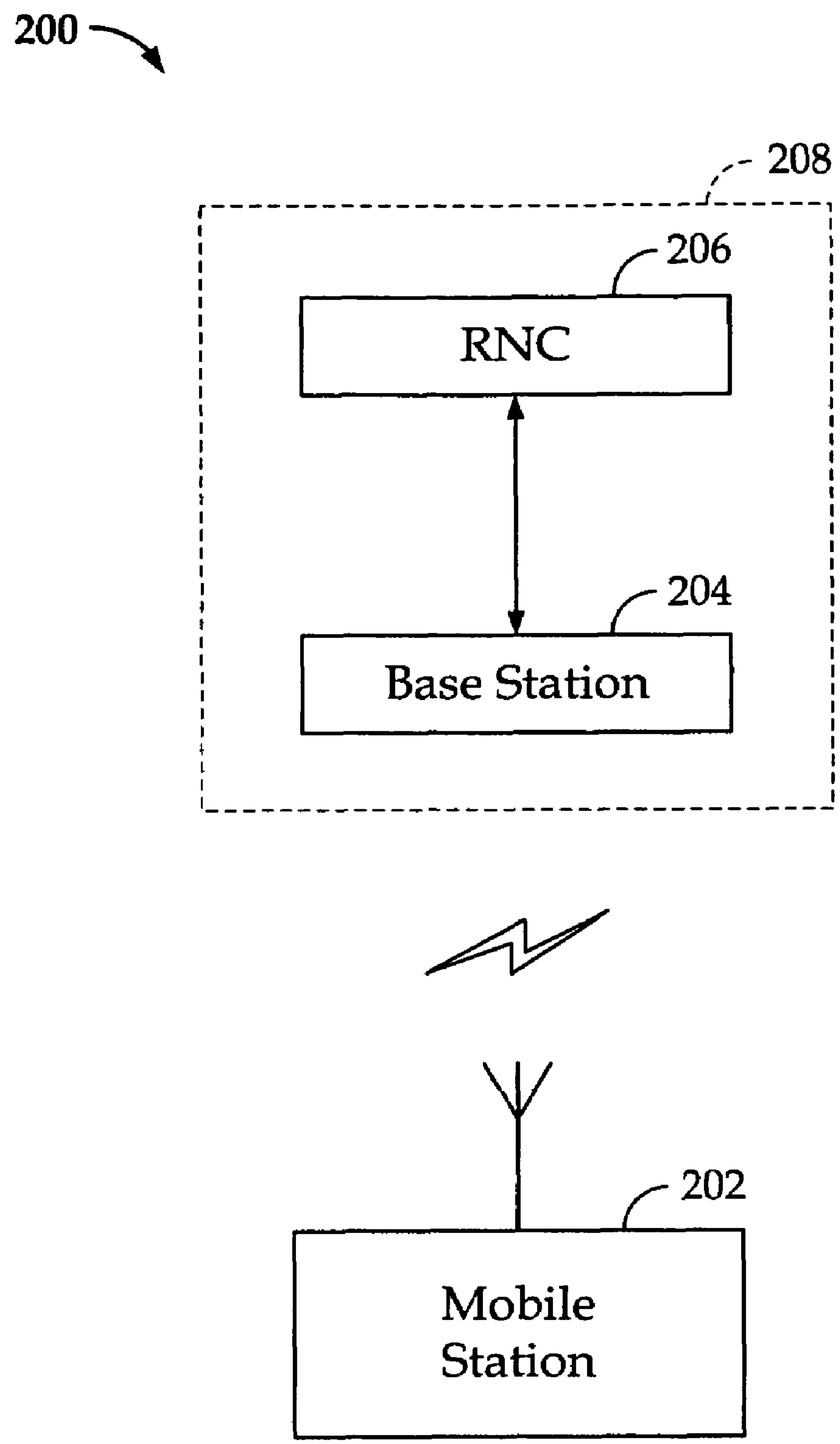
FIG. 2 comprises an exemplary communications system in which various embodiments can be implemented.

Referring now to the drawings, and in particular to FIG. 2, for purposes of providing an illustrative but non-exhaustive example to facilitate this description, a specific operational paradigm using a wireless communication network is shown and indicated generally at reference numeral 200. Those skilled in the art, however, will recognize and appreciate that the specifics of this illustrative example are not specifics of the invention itself and that the teachings set forth herein are applicable in a variety of alternative settings. For example, since the various teachings are not platform dependent, they can be applied to any communication network that includes different types of data transmission. Thus, any digital broadcast services or digital satellite services may also applicable. These various platforms and network implementations are, as a result, within the scope of the invention, and various embodiments for these multiple implementations are readily understood and appreciated by one skilled in the art.

Pursuant to this example, a mobile station ("MS") 202 communicates with a base station ("BS") 204 that is operably coupled to a radio network controller ("RNC") 206. As commonly known in the art, the RNC 206 typically controls multiple BSs 204 (one shown) for data transmission between the MS 202 and the serving BS 204. In this example, typical of a general communication network, the MS 202 sends requests and/or data to the serving BS 204, which, in turn, forwards the requests and/or data to the RNC for processing. In the various teachings, the BS 204 and the RNC 206 cooperatively route the MS 202 to a proper data channel. The various embodiments described contemplate data transmission that may be transitioned between two or more different data channels. For clarity and simplicity, a high speed shared data channel and a low speed non-shared data channel are used throughout the following description as one of the many embodiments, which are readily appreciated by one skilled in the art. As a result, the various teachings described are not limited to an implementation of only two types of data channels, and any implementations of more than two types of data channels are within the scope of the embodiments provided.

Furthermore, since current cell phones have many similar functions to that of computer devices, a mobile station will be herein used to refer to any device that transmit data through the network, which includes, but is not limited to, cell phones, personal digital assistants, and/or computers. Moreover, the BS 204 along with the RNC 206 will herein be referred to as a network controller 208 to emphasize that the various teachings described can be implemented fully or partially on either the BS 204 and/or the RNC 206. The communication system 100 shown is a typical exemplary structure of a cellular communication network that is suitable for various embodiments described.

Figure 3:
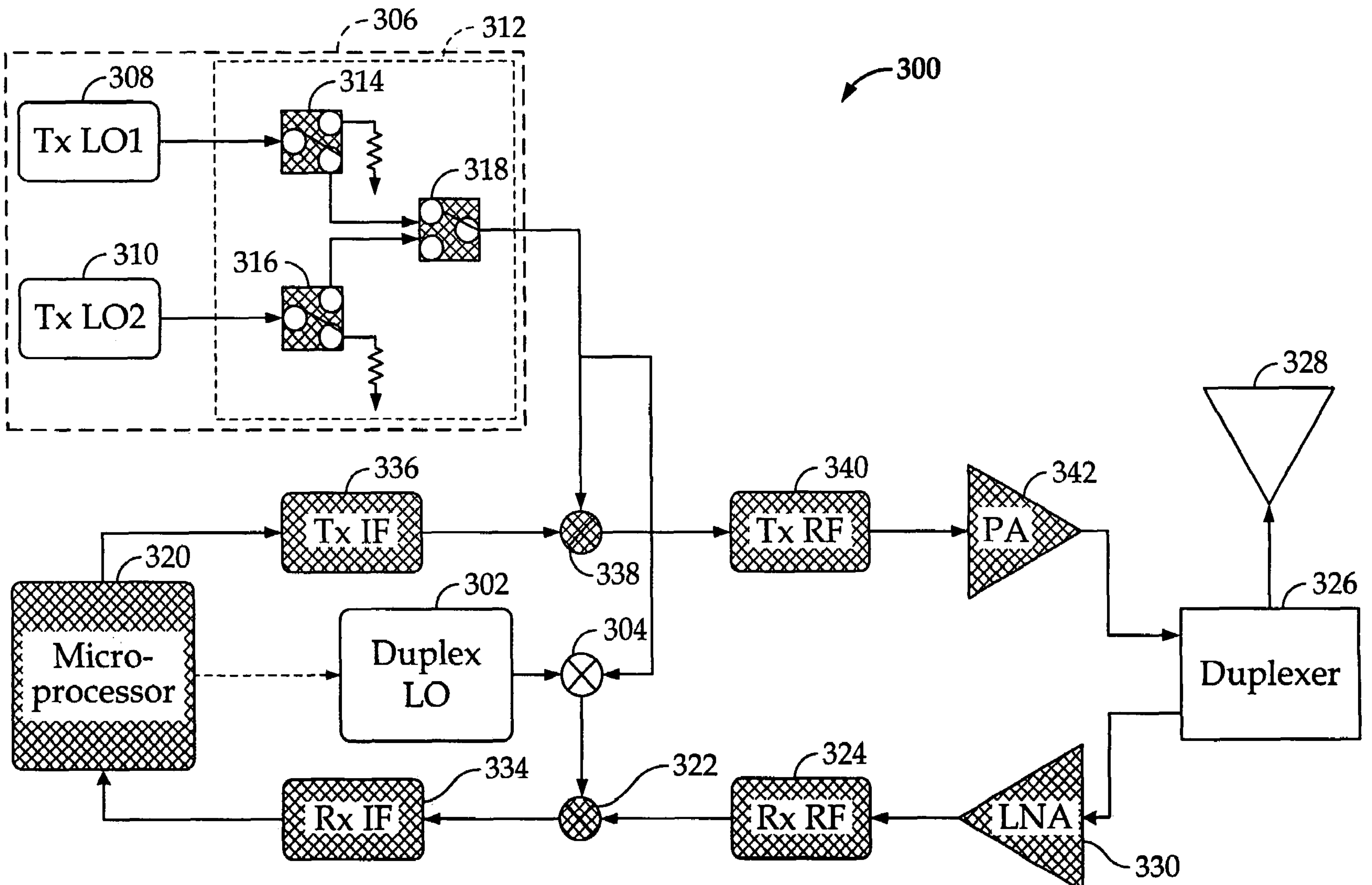
FIG. 3 comprises a base station radio according to an embodiment of the invention implemented at the transmitter local oscillator.

Turning now to FIG. 3, a base station radio implemented at the transmitter local oscillator according to various embodiments is shown and indicated generally at reference numeral 300. Please note that as will be readily appreciated by one skilled in the art, the circuits and the arrangement of these circuits shown are only given as one of many configurations and circuitry topologies available, and these various alternative embodiments, although not shown, are readily appreciated by a skilled artisan. Thus, they are within the scope of the various teachings described. Moreover, since the base station radio shown is a partial view of circuitry topology of a base station radio, the radio station radio 200 shown does not necessarily include all of the components required of a typical base station radio. As such, it should be understood that the various teachings may include other circuit components that may not be shown but are well known to one skilled in the art. Moreover, "circuit" refers to any type of executable instructions that can be implemented as hardware, firmware, and/or software, which are all within the scope of the various teachings described.

In this implementation shown, a duplex local oscillator 302 and a duplex mixer 304 have been included in place of a receiver local oscillator frequency synthesizer. In this implementation, a transmitter local oscillator frequency synthesizer section 306 is used together with the duplex local oscillator 302 as a receiver and a transmitter local oscillator. Specifically, the transmitter local oscillator frequency synthesizer section 306 includes a first transmitter local oscillator 308 and a second transmitter local oscillator 310 coupled to a switch section 312 that includes first, second, and third transmitter switches 314, 316, 318, respectively.

In particular, the duplex local oscillator 302 obtains, from a micro-processor 320, a duplex local oscillator frequency at a selected timeslot. According to an embodiment, this duplex local oscillator frequency at the selected timeslot is a predefined duplex local oscillator frequency assigned to multiple timeslots that includes the selected timeslot. In another embodiment, the duplex local oscillator frequency at a selected timeslot is obtained using a predefined condition, such as the mathematical formula shown below:

$$f_{Dm}=f_{RFLO\_N+m}-f_{RFLO\_m}+D \quad (1)$$

where $f_{Dm}$ is the duplex local oscillator frequency, $f_{RFLO\_N+m}$ is the radio frequency local oscillator frequency at timeslot N+m, $f_{RFLO\_m}$ is the radio frequency local oscillator frequency at timeslot m, and D is the duplex spacing value such that N+m=mod(N+m)k, where N is the transmitter-to-receiver timeslot offset value, m is the selected timeslot, and k+1 is the number of timeslots per frame.

In this implementation, an assessment of a radio frequency local oscillator frequency at an offset timeslot (N+m) (e.g., offset by the predefined transmitter-to-receiver timeslot offset value (N) from the selected timeslot (m)) is first made. This radio frequency local oscillator frequency at the offset timeslot is converted to the duplex local oscillator frequency at the selected timeslot based, at least in part, on a predetermined condition, such as the mathematical formula (1) presented above. Please note, however, that this mathematical formula (1) has been presented as one example, and the predefined duplex local oscillator frequency that is assigned to multiple timeslots is another example. Other predefined conditions, which are readily appreciated by a skilled artisan, can also be used depending upon the specific communications system implementation. As such, other predefined conditions that are readily appreciated by one skilled in the art, although possibly not specifically described, are contemplated and within the scope of various teachings described.

The duplex local oscillator 302 converts the duplex local oscillator frequency at the selected timeslot to a duplex local oscillator signal and outputs the signal to the mixer 304. The third switch 318 also outputs another radio frequency local oscillator signal, which is obtained from radio frequency local oscillator frequency that is typically based on a channel frequency list, as is well known in the art. The duplex mixer 304 mixes the duplex local oscillator signal from the duplex local oscillator 302 and the radio frequency local oscillator signal from the third switch 318 to provide a converted radio frequency local oscillator signal. This converted radio frequency local oscillator signal is then used to down-convert the received radio signal without using a receiver synthesizer section. In particular, the duplex mixer 304 provides this converted radio frequency local oscillator signal to a receiver mixer 322, which also obtains a receiver radio frequency signal from a receiver radio frequency section 324. In particular, as typically done in a base station, the radio frequency signal is received at a duplexer 326 via an antenna 328. The received radio frequency is outputted to the receiver radio frequency section 324 after adjustment through a low noise amplifier 330. The receiver radio frequency section 324 filters and amplifies the receiver radio frequency signal and provides this signal to the receiver mixer 322.

Since the receiver mixer 322 mixes the converted radio frequency local oscillator signal from the duplex mixer 304 along with the receiver radio frequency signal from the receiver radio frequency section 324 in order to provide a receiver mixed signal, such as an intermediate frequency signal, the received radio frequency signal is being adjusted for output without specifically using a receiver synthesizer section. The receiver mixed signal is provided to a receiver intermediate frequency section 334 from the receiver mixer 322, which converts the receiver mixed signal to provide a receiver intermediate frequency signal for output as data.

On the transmit side, base station radio 300 includes typical transmitter components, such as a transmitter intermediate frequency section 336 coupled to the microprocessor 320 and a transmitter mixer 338 and a transmitter radio frequency section 340 coupled to the transmitter mixer 338 and a power amplifier 342. When data from the microprocessor 320 needs to be transmitted, as typically done, the data are forwarded to the transmitter intermediate frequency section 336, which converts the data into a transmitter intermediate frequency signal for forwarding to the transmitter mixer 338. The transmitter mixer 338 mixes the transmitter intermediate frequency signal and a transmitter radio frequency local oscillator signal from the third switch 318 to provide a transmitter mixed signal, usually a radio frequency signal, to the transmitter radio frequency section 340.

Specifically, the first and second transmitter local oscillator 308, 310 forward a first and second transmitter local oscillator signal to the first and second switches 314, 316, respectively. The first and second switches 314, 318 forwards these first and second transmitter local oscillator signals with priority for output to the third switch 318 that ultimately outputs the radio frequency local oscillator signal to the transmitter mixer 338. Using the transmitter intermediate frequency signal and the transmitter radio frequency local oscillator signal, the transmitter mixer 338 forwards a transmitted mixed signal to the transmitter radio frequency section 340, which converts the transmitter mixed signal to a transmitter radio frequency signal for output to the power amplifier 342. The duplexer 326 coupled to the power amplifier 342 then outputs the transmitter radio frequency signal via the antenna 328.

Figure 4:
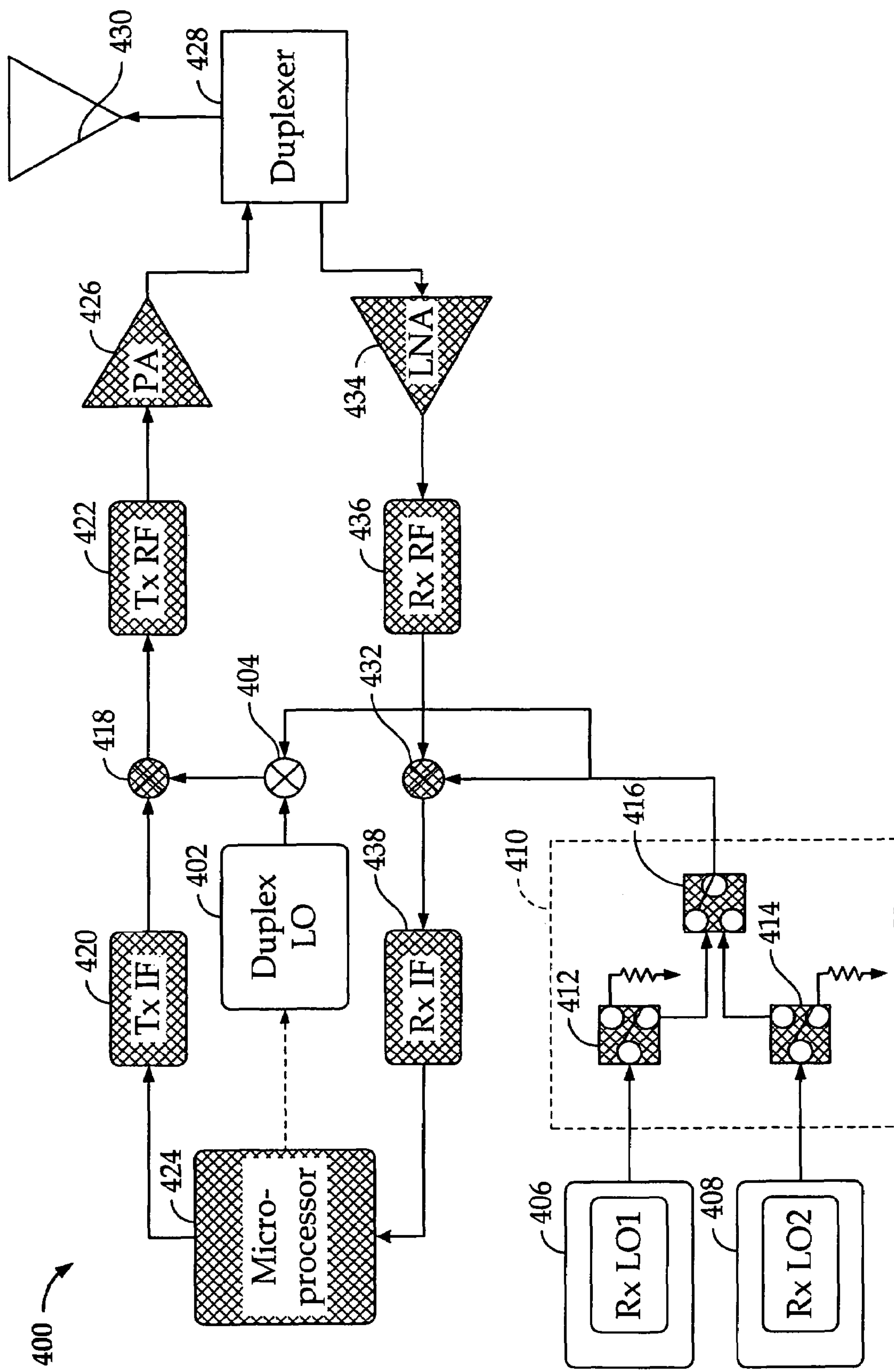
FIG. 4 comprises a base station radio according to an embodiment of the invention implemented at the receiver local oscillator.

FIG. 4 shows a base station radio according to an embodiment implemented at the receiver local oscillator. A similar duplex local oscillator 402 and a duplex mixer 404 are included, but in this implementation, they receive a radio frequency local oscillator signal from either a first or second receiver local oscillators 406, 408 instead of transmitter local oscillators. Specifically, the first and second receiver local oscillators 406, 408 are coupled to a receiver switch section 410, which includes a first, second, and third switch 412, 414, 416. The duplex mixer 404 again forwards a converted radio frequency local oscillator signal, which comprises mixed signals from a duplex local oscillator signal from the duplex local oscillator 402 and a radio frequency local oscillator signal from the third switch 416, to a transmitter mixer 418 coupled to a transmitter intermediate frequency section 420 and a transmitter radio frequency section 422.

Specifically, a microprocessor 424 provides data to be transmitted to the transmitter intermediate frequency section 420 that converts the data into a transmitter intermediate frequency signal, which is provided to the transmitter mixer 418. By mixing the transmitter intermediate frequency signal from the transmitter intermediate frequency section 420 with the converted radio frequency signal from the duplex mixer 404, the transmitter radio frequency signal is adjusted and can be outputted without using a transmitter local oscillator synthesizer. In particular, the transmitter mixer 418 outputs a transmitter mixed signal to the transmitter radio frequency section 422, which filters and amplifies it for output to a power amplifier 426. A duplexer 428 outputs the transmitter radio frequency via an antenna 430.

On the receive side, a radio frequency signal is received from the duplexer 428 via the antenna 430. After adjustment of the received radio frequency signal by a low noise amplifier 434, the adjusted radio frequency is forwarded to a receiver frequency section 436 that outputs a receiver radio frequency signal to the receiver mixer 432. Receiving this receiver radio frequency signal from the receiver radio frequency section 436, the receiver mixer 432 mixes it with a receiver radio frequency local oscillator from the third switch 416 and outputs this receiver mixed signal to a receiver intermediate frequency section 438. A receiver intermediate frequency signal is generated with the receiver mixed signal by the receiver intermediate frequency section 438. The receiver intermediate frequency signal is then used to generate the data that was received as the radio frequency signal.

Figure 5:
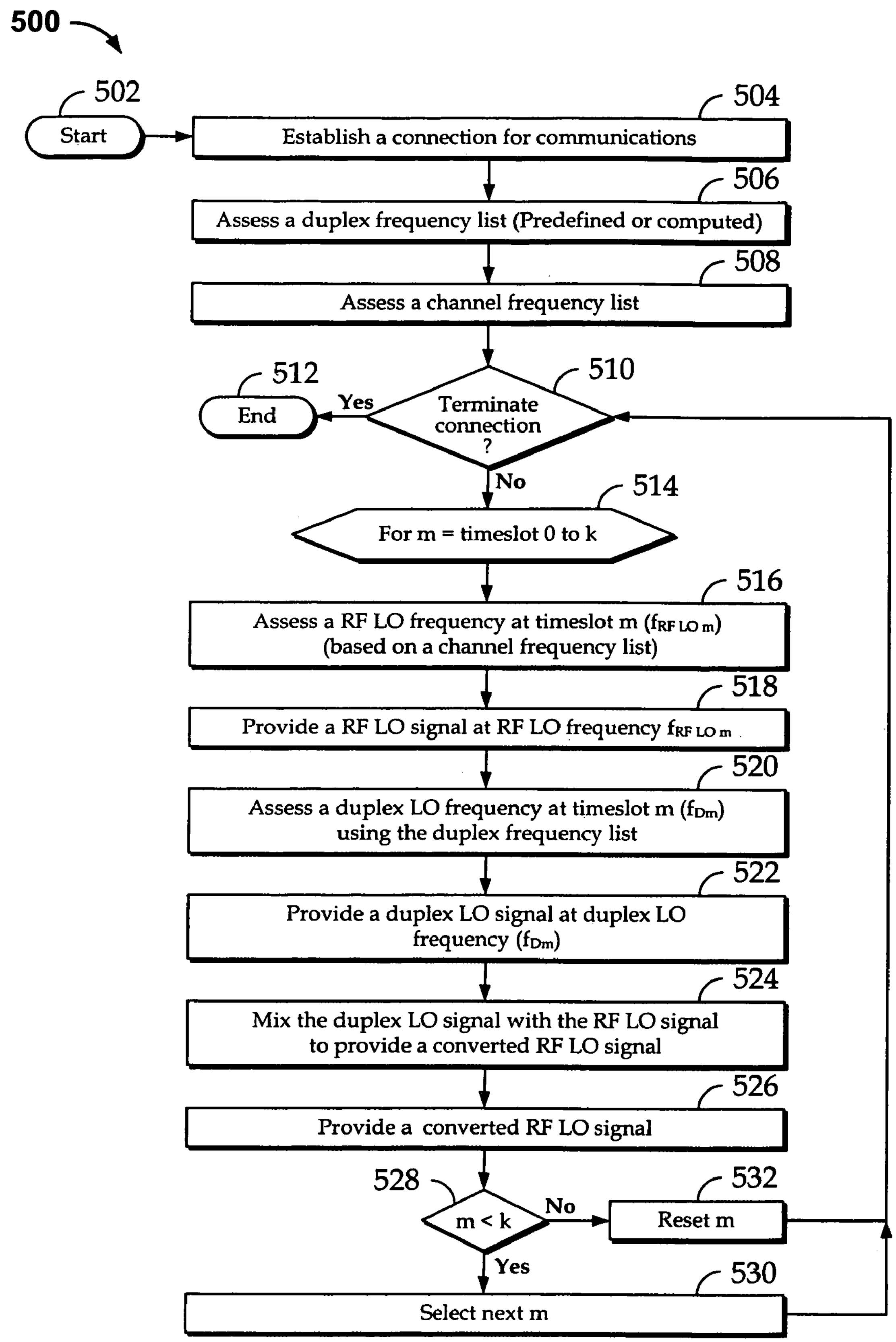
FIG. 5 comprises a flow chart diagram of a duplex process according to an embodiment of the invention.

Referring now to FIG. 5, a flow chart diagram of a duplex process according to an embodiment of the invention is shown and indicated generally at 500. These processes, as shown, can be implemented fully or partially at either the BS 204 and/or the RNC 206 or their equivalents. Moreover, as one skilled in the art can readily appreciate, any of the processes shown can be altered in multiple ways to achieve the same functions and results of the various teachings described. As a result, these processes shown are one exemplary embodiment of multiple variation embodiments that may not be specifically shown. These other embodiments, however, are also within the scope of the various teachings described.

The process 500 may be initiated 502 with a connection for communications being established 504, which is shown as an example. Please note there may be other actions to trigger the process 500, and the trigger actions may depend upon the configuration of the communication system. These proper trigger actions, however, are readily appreciated by one skilled in the art. Since the establishment of a communication is one of the most common trigger actions, this example is particularly shown through process 500 as an example for clarity. Once a communications connection has been established 504, a duplex frequency list is assessed 506, which can either include a predefined value(s) or a computed value(s). A channel frequency list is also assessed 508. Next, it is determined 510 whether the communications connection has been terminated. If so, the process 500 ends 512, since timeslots of the frames do not have to be processed if communications have been terminated. Otherwise, the process 500 continues and for each selected timeslot m that ranges from timeslot 0 to k 514, where k equals the total number of timeslots per frame minus one.

For a selected timeslot m, a radio frequency local oscillator frequency at the selected timeslot m ($f_{RFLO\ m}$) is assessed 516, which is typically based on a channel frequency list. A radio frequency local oscillator signal is provided 518 at the radio frequency local oscillator frequency at the selected timeslot m ($f_{RFLO\ m}$). A duplex local oscillator frequency at the selected timeslot m ($f_{Dm}$) is assessed 520 to provide 522 a duplex local oscillator signal. The radio frequency local oscillator signal and the duplex local oscillator frequency at the selected timeslot m are mixed 524 to provide 526 a converted radio frequency local oscillator signal for output. Upon this converted radio frequency local oscillator signal at the selected timeslot m is obtained, it is checked to determine 528 whether all timeslots of the frame have been processed. Specifically, it is determined 528 whether the selected timeslot m is less than the k value, and if so, a next timeslot is selected 530 to provide a next selected timeslot m and loops back to determine 510 whether the communications connection has been terminated. If, however, the selected timeslot m is less than the k value, which is an indication that all timeslots have been processed, the timeslot m value is reset 532 for use for a next frame and loops back to again to determine 510 whether the communications connection has been terminated.

Figure 6:
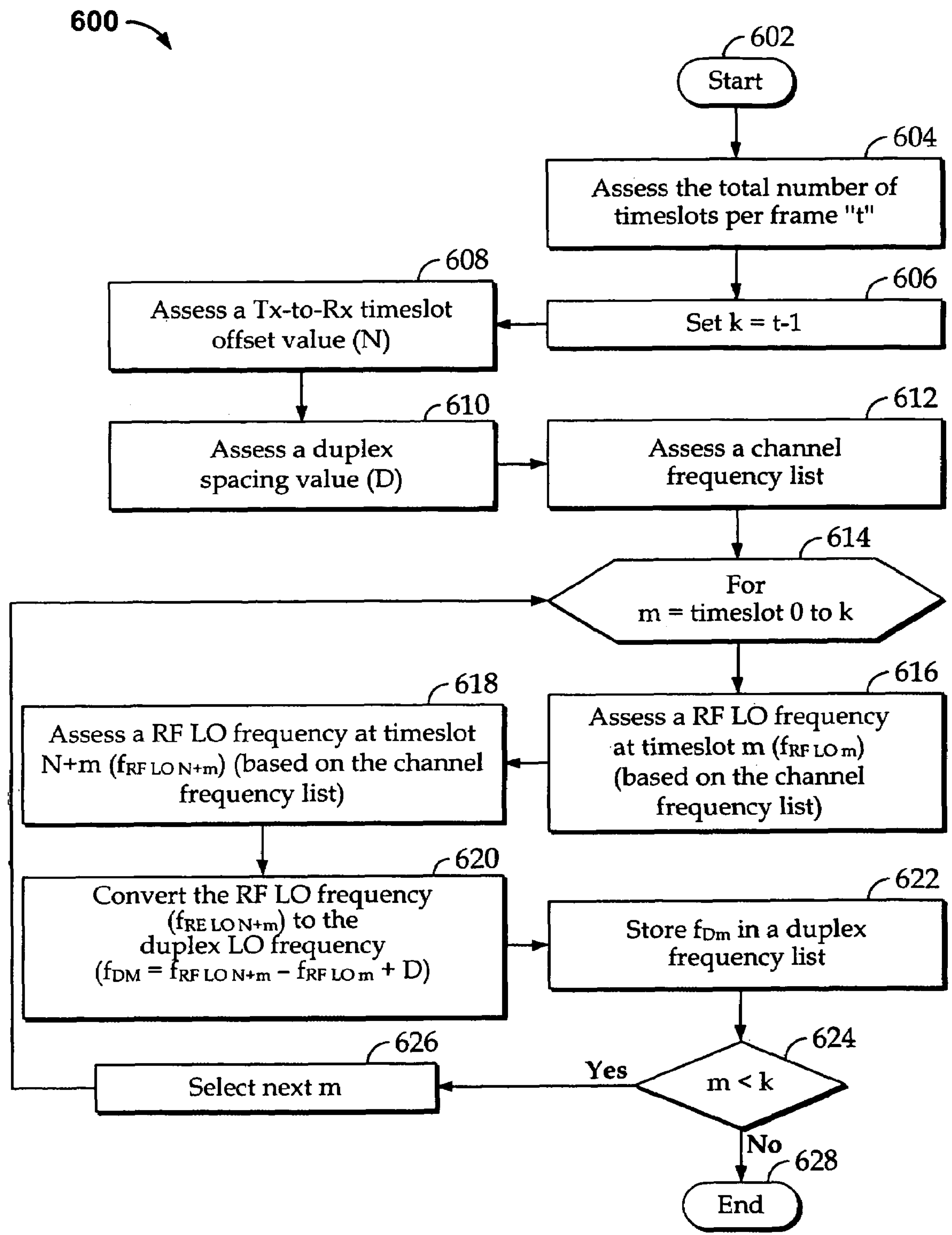
FIG. 6 comprises a flow chart diagram of a compute process for generating a duplex frequency list according to an embodiment of the invention.

FIG. 6 shows a flow chart diagram of a computer process for generating a duplex frequency list according to an embodiment of the invention. In this particular example shown, a duplex local oscillator frequency for each timeslot is computed to generate a duplex frequency list described in FIG. 5. The process 600 initiates 602 by assessing 604 a total number of timeslots t per frame and a k value is set 606 to the total number of timeslots t minus one. Multiple initial values are assessed before the subroutine process is initiated for each timeslot of the frame. Specifically, a transmitter-to-receiver timeslot offset value N is assessed 608, a duplex spacing value D is assessed 610, and a channel frequency list is assessed 612. After these initial values are assessed, for each selected timeslot m 614, which ranges from timeslot 0 to timeslot k, a radio frequency local oscillator frequency at the selected timeslot ($f_{RF\ LO\ m}$) is assessed 616, and a radio frequency local oscillator frequency at a timeslot offset by the transmitter-to-receiver timeslot offset value N ($f_{RF\ LO\ N+m}$) is assessed 618. Using these assessed radio frequency local oscillator frequencies, the radio frequency local oscillator frequency ($f_{RF\ LO\ N+m}$) is converted 620 to a duplex local oscillator frequency ($F_{Dm}$) using a predetermined condition, such as the mathematical formula (1), as shown below and as was presented above:

$$f_{Dm}=f_{RFLO\_N+m}-f_{RFLO\_m}+D \quad (1)$$

After this duplex local oscillator frequency ($F_{Dm}$) is obtained for this selected timeslot, it is preferably stored 622 to a data structure, such as a table or an array. To check all the timeslots for the given frame, it is next determined 624 whether the current selected timeslot m is less than the k value. If so, which means that the last timeslot of the frame has been not been processed, a next timeslot is selected 626 to provide a new selected timeslot m, and the process loops back to the subroutine initiation 614 of setting m to the selected timeslot. Once all the timeslots of the frame have been processed, the process ends 628 at this point, since the duplex local oscillator frequencies for the timeslots have been computed.

With these various teachings shown, a duplex local oscillator technique has been provided that allows a duplex frequency synthesizer to remove at least one transmitter and/or receiver local oscillator frequency synthesizer section. As a result, the component count of the synthesizer is reduced, and the direct material cost and printed circuit board space are, in turn, reduced. Moreover, this reduction of the synthesizer is achieved without sacrificing frequency hopping capabilities and/or time offset required for a frequency hopping full duplex communications channel. The various embodiments further offer flexibility in implementation, because they can be applied to any air-interface standard where frequency hopping and full duplex communications channels are required. Potentially, this reduction of direct material cost can save millions of dollars, and at the same time, the extra printed circuit board space can provide space for additional features.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of providing a radio frequency local oscillator signal for a full-duplex transceiver having a time-offset between transmit and receive operation, the method comprising the steps of:

determining whether a selected timeslot is available;

selecting the selected timeslot when the selected timeslot is available;

assessing a radio frequency local oscillator frequency at multiple timeslots including the selected timeslot to provide a radio frequency local oscillator signal at the multiple timeslots;

assessing a duplex local oscillator frequency at multiple timeslots including the selected timeslot to provide a duplex local oscillator signal at the selected timeslot;

assessing an offset timeslot of the multiple timeslots that is offset by a predefined transmitter-to-receiver timeslot offset value from the selected timeslot;

mixing the duplex local oscillator signal and the radio frequency local oscillator signal to provide a converted radio frequency local oscillator signal at the multiple timeslots based at least in part on a predetermined condition, for either a transmit or receive function, exclusively, wherein the predetermined condition is $$f_{Dm}=f_{RFLO\_N+m}-f_{RFLO\_m}+D$$

where $f_{Dm}$ is the duplex local oscillator frequency, $f_{RFLO\_N+m}$ is the radio frequency local oscillator frequency at timeslot N+m, $f_{RFLO\_m}$ is the radio frequency local oscillator frequency at timeslot m, and D is the duplex spacing value such that N+m=mod(N+m)k, where N is the transmitter-to-receiver timeslot offset value, m is the selected timeslot, and k+1 is the number of timeslots per frame; and providing the converted radio frequency local oscillator signal at multiple timeslots.

2. The method according to claim 1, wherein the converted radio frequency local oscillator signal is one of a transmitter signal converted from a receiver signal and a receiver signal converted from a transmitter signal.

3. The method according to claim 1, wherein the duplex local oscillator frequency at the selected timeslot is a predefined duplex local oscillator frequency assigned to a plurality of timeslots that comprises the selected timeslot.

4. The method according to claim 1 further comprising, prior to mixing the duplex local oscillator signal and the radio frequency local oscillator signal:

assessing a channel frequency list;

wherein the radio frequency local oscillator frequency at the selected timeslot is obtained from the channel frequency list.

5. The method according to claim 1 further comprising, prior to mixing the duplex local oscillator signal and the radio frequency local oscillator signal:

providing the duplex local oscillator signal to a mixer that mixes the duplex local oscillator signal with the radio frequency local oscillator signal;

providing the radio frequency local oscillator signal to the mixer.

6. The method according to claim 1 further comprising, prior to assessing a duplex local oscillator frequency at the selected timeslot:

establishing a connection for communications;

determining whether the connection should be terminated;

assessing a duplex local oscillator frequency at each timeslot of a plurality of timeslots to provide a converted radio frequency local oscillator signal until the connection should be terminated.

7. The method according to claim 1 further comprising, wherein the predetermined condition is based, at least in part, on a duplex spacing value and further comprising, prior to converting the radio frequency local oscillator frequency at the offset timeslot to the duplex local oscillator frequency at the selected timeslot based, at least in part, on a predetermined condition:

assessing the duplex spacing value.

8. An apparatus for providing a radio frequency local oscillator signal for a full-duplex transceiver having a time-offset between transmit and receive operation, the apparatus comprising:

a processor that is operable to determine whether a selected timeslot is available and selects the selected timeslot when the selected timeslot is available;

a duplex local oscillator that is operable to assess a radio frequency local oscillator frequency at multiple timeslots including the selected timeslot to provide a radio frequency local oscillator signal at the multiple timeslots, assess a duplex local oscillator frequency at multiple timeslots including the selected timeslot to provide a duplex local oscillator signal at the selected timeslot, and assess an offset timeslot of the multiple timeslots that is offset by a predefined transmitter-to-receiver timeslot offset value from the selected timeslot;

a mixer coupled to the duplex local oscillator, wherein the mixer is operable to mix the duplex local oscillator signal and the radio frequency local oscillator signal to provide a converted radio frequency local oscillator signal at the multiple timeslots based at least in part on a predetermined condition, for either a transmit or receive function, exclusively, wherein the predetermined condition is $$f_{Dm}=f_{RFLO\_N+m}-f_{RFLO\_m}+D$$

where $f_{Dm}$ is the duplex local oscillator frequency, $f_{RFLO\_N+m}$ is the radio frequency local oscillator frequency at timeslot N+m, $f_{RFLO\_m}$ is the radio frequency local oscillator frequency at timeslot m, and D is the duplex spacing value such that N+m=mod(N+m)k, where N is the transmitter-to-receiver timeslot offset value, m is the selected timeslot, and k+1 is the number of timeslots per frame.

9. The apparatus according to claim 8 further comprising:

a transceiver coupled to the mixer, wherein the transceiver provides the radio frequency local oscillator signal at the selected timeslot to the mixer.

10. The apparatus according to claim 8, wherein the duplex local oscillator frequency at the selected timeslot is a predefined duplex local oscillator frequency assigned to a plurality of timeslots that comprises the selected timeslot.

* * * * *